US012313222B2

(12) United States Patent
Artusi

(10) Patent No.: US 12,313,222 B2
(45) Date of Patent: May 27, 2025

(54) CYLINDER WITH CORE IN PLASTIC MATERIAL AND SURFACE COVERING IN COMPOSITE MATERIAL PROVIDED WITH NOZZLE AND RELATED METHOD OF PRODUCTION

(71) Applicant: CARBON CYLINDER S.R.L., Mira (IT)

(72) Inventor: Giovanni Artusi, Mira (IT)

( * ) Notice: Subject to any disclaimer, the term of this patent is extended or adjusted under 35 U.S.C. 154(b) by 0 days.

(21) Appl. No.: 18/262,426

(22) PCT Filed: Jan. 26, 2022

(86) PCT No.: PCT/EP2022/051775
§ 371 (c)(1),
(2) Date: Jul. 21, 2023

(87) PCT Pub. No.: WO2022/175041
PCT Pub. Date: Aug. 25, 2022

(65) Prior Publication Data

US 2024/0240763 A1 Jul. 18, 2024

(30) Foreign Application Priority Data

Feb. 17, 2021 (IT) ........................ 102021000003650

(51) Int. Cl.
*F17C 13/04* (2006.01)
*F17C 13/06* (2006.01)

(52) U.S. Cl.
CPC .............. *F17C 13/04* (2013.01); *F17C 13/06* (2013.01); *F17C 2201/0109* (2013.01);
(Continued)

(58) Field of Classification Search
CPC .. F17C 1/06; F17C 13/04; F17C 13/06; F17C 2201/0109; F17C 2201/0104;
(Continued)

(56) References Cited

U.S. PATENT DOCUMENTS 1,413,502 A * 4/1922 Steinmetz ............... F17C 13/06 220/288
3,843,010 A 10/1974 Morse et al.
5,088,685 A * 2/1992 Salvucci, Sr. ......... F17C 13/085 220/582
5,429,845 A * 7/1995 Newhouse ................ F17C 1/16 220/582

(Continued)

FOREIGN PATENT DOCUMENTS

WO WO-2010096517 A1 * 8/2010 ............ F17C 13/002
WO 2017125098 A1 7/2017

OTHER PUBLICATIONS

International Search Report for corresponding PCT/EP2022/051775 dated Apr. 14, 2022.

(Continued)

*Primary Examiner* — Robert J Hicks
(74) *Attorney, Agent, or Firm* — Egbert, McDaniel & Swartz, PLLC

(57) ABSTRACT

High-pressure cylinder having an inner core in plastic material and a surface covering of one or more layers of composite material, partially incorporating a nozzle in metal material attached to the upper terminal portion of the neck of the core shaped to receive at least one accessory, such as a tap or a valve. The nozzle is composed of an inner element and an external element screwed one to the other to tighten on the neck of the core. The neck of the core has a slight narrowing of diameter starting from its mouth, such as to determine an internal conical surface suitable for coupling with a corresponding external conical surface of the internal element of the nozzle, and an external conical surface suitable for coupling with a corresponding internal conical surface of the external element of the nozzle.

7 Claims, 4 Drawing Sheets

(52) U.S. Cl.
CPC ................ *F17C 2203/0604* (2013.01); *F17C 2205/0305* (2013.01); *F17C 2209/2127* (2013.01); *F17C 2209/2154* (2013.01); *F17C 2209/234* (2013.01)

(58) Field of Classification Search
CPC ........ F17C 2260/011; F17C 2203/0604; F17C 2203/0663; F17C 2205/0305; F17C 2205/0308; F17C 2205/0311; F17C 2209/234; F17C 2209/2127; F17C 2209/2154; B65D 51/1644; B65D 41/0407; B65D 41/04
USPC ....... 220/582, 581, 589, 588, 586, 303, 304, 220/288; 206/0.6
See application file for complete search history.

(56) References Cited

U.S. PATENT DOCUMENTS

| | | | | |
|---|---|---|---|---|
| 6,186,356 | B1 * | 2/2001 | Berkley | F17C 1/00<br>220/582 |
| 8,397,938 | B2 * | 3/2013 | Strack | F16J 12/00<br>220/582 |
| 10,830,394 | B2 | 11/2020 | Garg | |
| 2011/0101002 | A1 | 5/2011 | Strack | |
| 2012/0085727 | A1 | 4/2012 | Fratti | |
| 2014/0034642 | A1 * | 2/2014 | Kato | B65D 53/00<br>220/203.12 |
| 2018/0202554 | A1 | 7/2018 | Hogan | |

OTHER PUBLICATIONS

Written Opinion of the International Searching Authority for corresponding PCT/EP2022/051775 dated Apr. 14, 2022.

* cited by examiner

CYLINDER WITH CORE IN PLASTIC MATERIAL AND SURFACE COVERING IN COMPOSITE MATERIAL PROVIDED WITH NOZZLE AND RELATED METHOD OF PRODUCTION

The present invention relates to a cylinder, more particularly for containing fluids (liquid or aeriform) at high pressure, having a core (liner) in plastic material and a surface covering made up of one or more layers of composite material, provided with a nozzle, composed of several parts, shaped to receive an accessory, such as, by way of a non-limiting example, a tap or a valve or other.

The invention also relates to a method for producing such a cylinder.

Various types of high-pressure cylinders are known that are obtained from an internal core in metal or plastic material, on which a nozzle in metal material is formed or applied, normally provided with a thread suitable for tightening a tap or a sealing valve. The core is then covered with one or more layers of reinforcing threads which also wrap around the external base of the nozzle.

A critical aspect of these cylinders is represented by the coupling between the neck of the core and the nozzle, especially in the case of a core in plastic material. In fact, at the interface between the plastic material of the core and the surface of the nozzle, the pressurised gas tends to produce a delamination with consequent possible leaking.

Various solutions have been proposed to try to limit this problem, none of which has proved completely satisfactory.

US 2011/101002 A1 discloses a boss for use with a vessel. The boss includes a first component adapted to be formed in an opening of the vessel, wherein the first component includes a first coupling element, and a second component including a second coupling element, wherein the second coupling element engages the first coupling element to secure the second component to the first component, and wherein a liner of the vessel is disposed therebetween.

It is, therefore, the object of the present invention to eliminate the disadvantages encountered in the solutions of the prior art.

More particularly, it is an object of the invention to provide a high-pressure cylinder with a core in plastic material and a surface covering in composite material, wherein the nozzle ensures an excellent seal over time under all conditions of use.

A further object of the invention is to provide such a cylinder in which the nozzle can be quickly and safely applied.

Yet another object of the invention is to provide such a cylinder in which a nozzle element suitable for receiving accessories is shaped so as to be removable for possible maintenance work.

These and other objects are achieved by the cylinder according to the invention that has the features of the appended independent claim 1.

Advantageous embodiments of the invention are disclosed in the dependent claims.

Substantially, the high-pressure cylinder according to the invention has an internal core or liner in plastic material and a surface covering constituted by one or more layers of composite material, partially incorporating a nozzle applied to the upper end part of the neck of the core conformed to receive at least one accessory, such as a tap, valve, or other, said nozzle comprising an internal metal element and an external metal element which can be screwed together to tighten on said neck of the core, wherein said core neck has a slight narrowing in diameter starting from its mouth, such as to determine an internal conical surface suitable for coupling with a corresponding external conical surface of the internal element of the nozzle, and an external conical surface, having the same conicity as its internal conical surface, suitable for coupling with a corresponding internal conical surface of the external element of the nozzle, and wherein said nozzle also comprises an annular protective element in plastic or elastomeric material, acting as a bearing, which is interposed between a widened base of the external element of the nozzle and the upper part of the core of the container.

The invention also relates to a method of producing the cylinder according to the invention.

Further features of the invention will be made clearer by the following detailed description, referring to a purely illustrative, and therefore non-limiting embodiment thereof, illustrated in the accompanying drawings, wherein:

FIG. 1*a* is a front elevation view of a high-pressure cylinder according to the invention:

FIG. 1*b* is a vertical semi-sectional view of the cylinder of FIG. 1*a;*

FIG. 1*c* is an enlargement of the detail denoted by the letter C in FIG. 1*b;*

FIG. 2*a* is a blown-up view of the cylinder of FIG. 1*a* without the external surface covering:

FIG. 2*b* is a section taken along line A-A of FIG. 2*a;*

FIG. 3*a* is a front elevation view of a preform used to form the core or liner of the cylinder;

FIG. 3*b* is a median section of the preform of FIG. 3*a* taken along line A-A:

Figure 6:
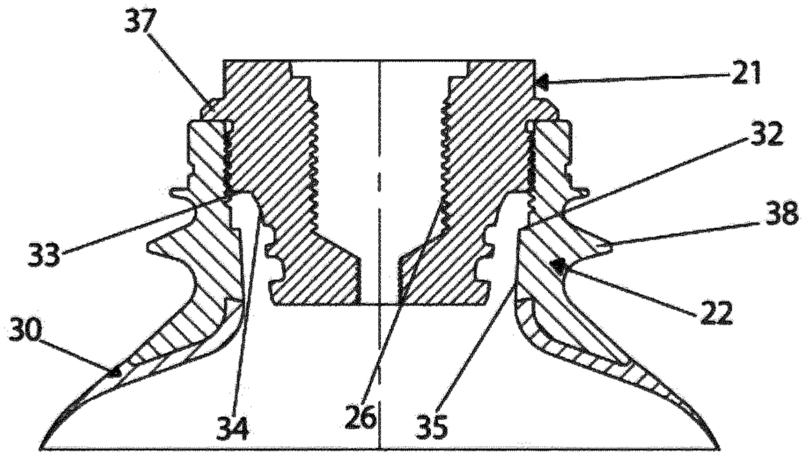
FIG. 6 is a median section view of the nozzle showing its assembled component parts, with the internal element, shown in a slightly different conformation from that of FIGS. 1*b*, 1*c* and 2*b;*
Figure 7A:
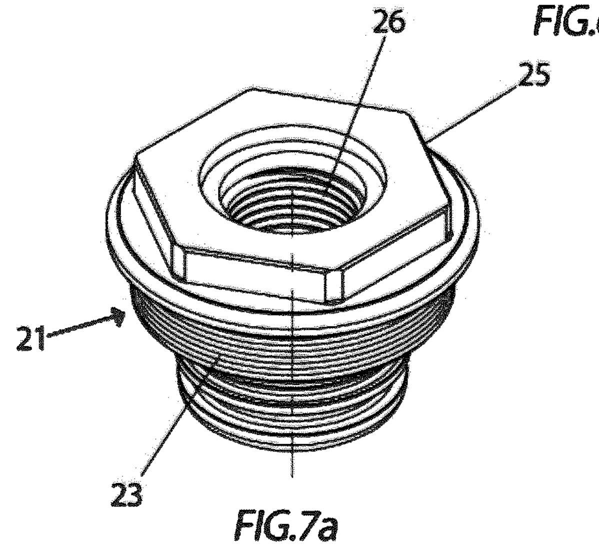
Figure 7B:
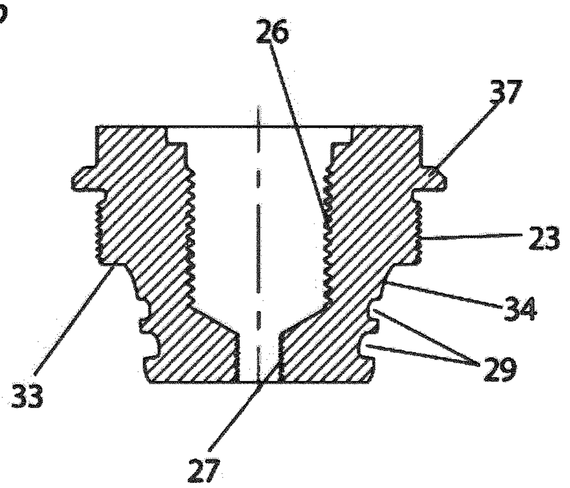
Figure 8A:
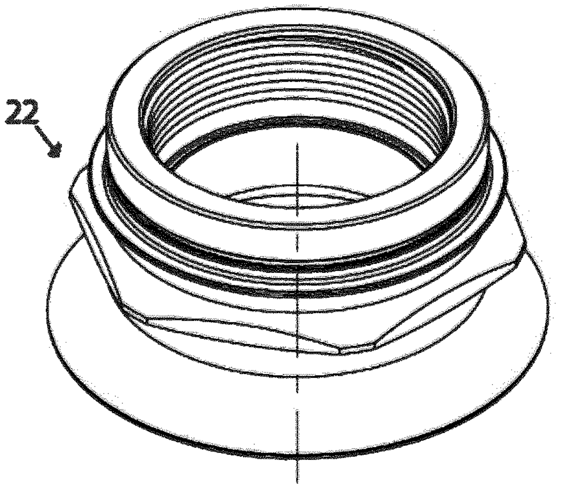
Figure 8B:
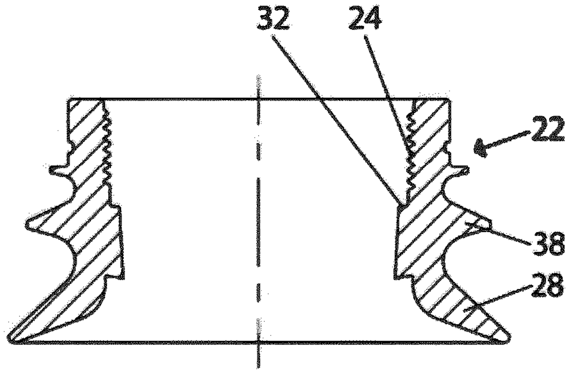

FIGS. 7*a* and 7*b* are, respectively, an axonometric view from above and a median section view of the internal element of the nozzle of FIG. 6:

FIGS. 8*a* and 8*b* are, respectively, an axonometric view from above and a median section view of the internal element of the nozzle of FIG. 6.

Figure 1A:
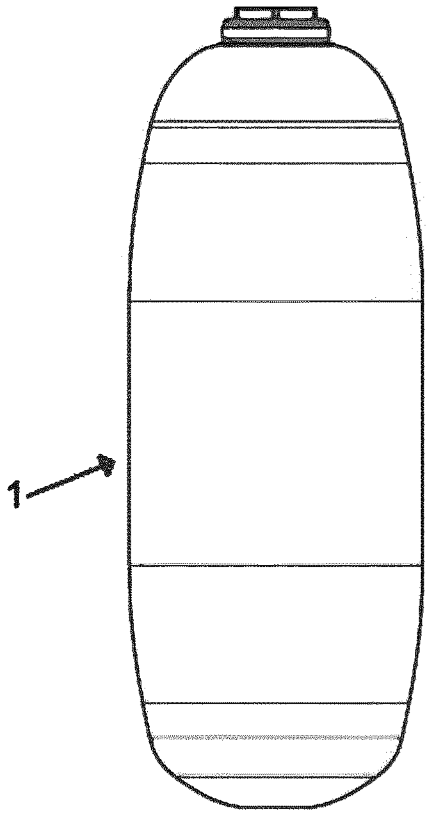
Figure 1B:
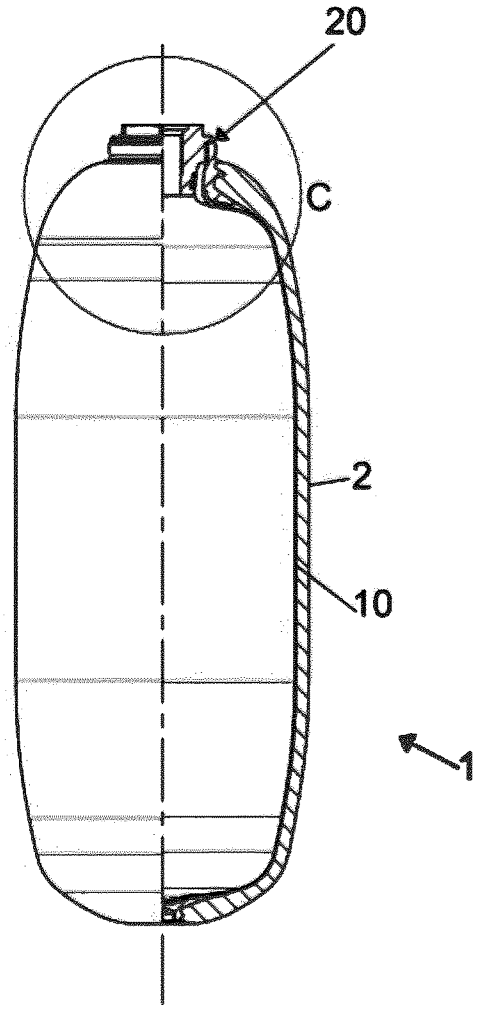
Figure 1C:
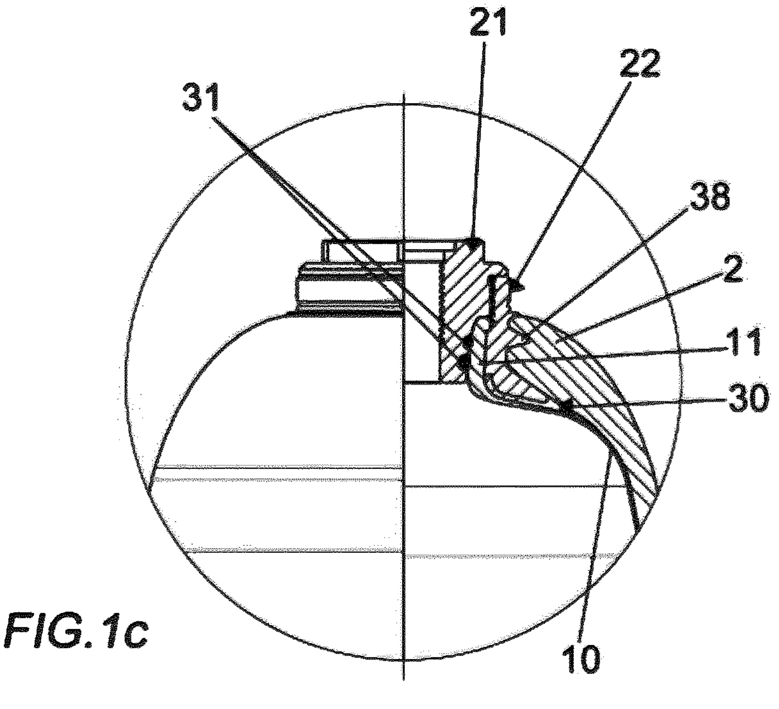
Figure 2A:
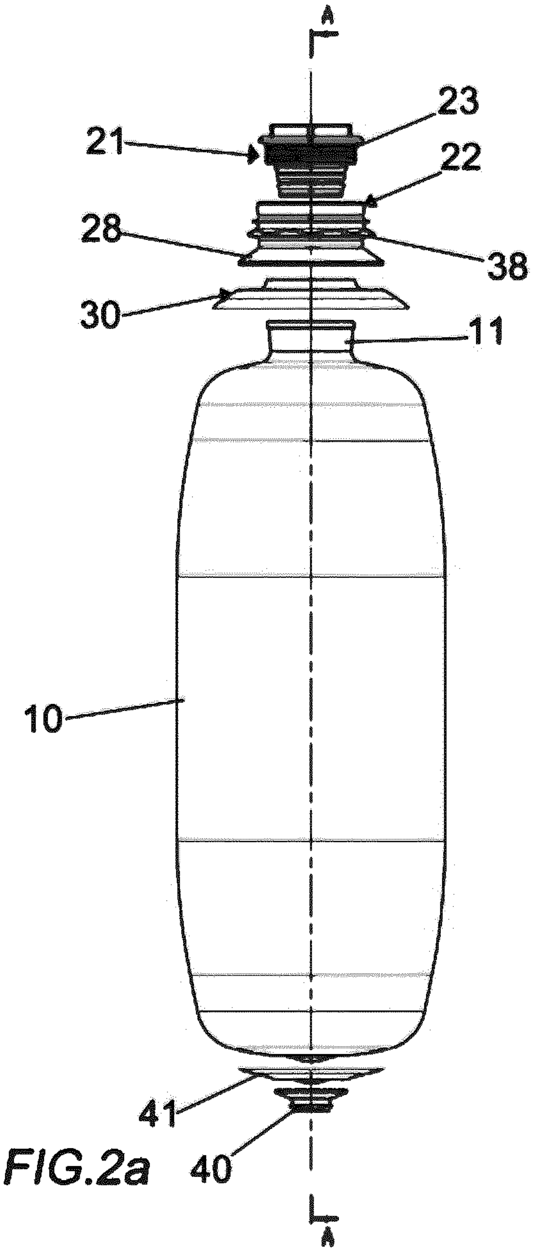
Figure 2B:
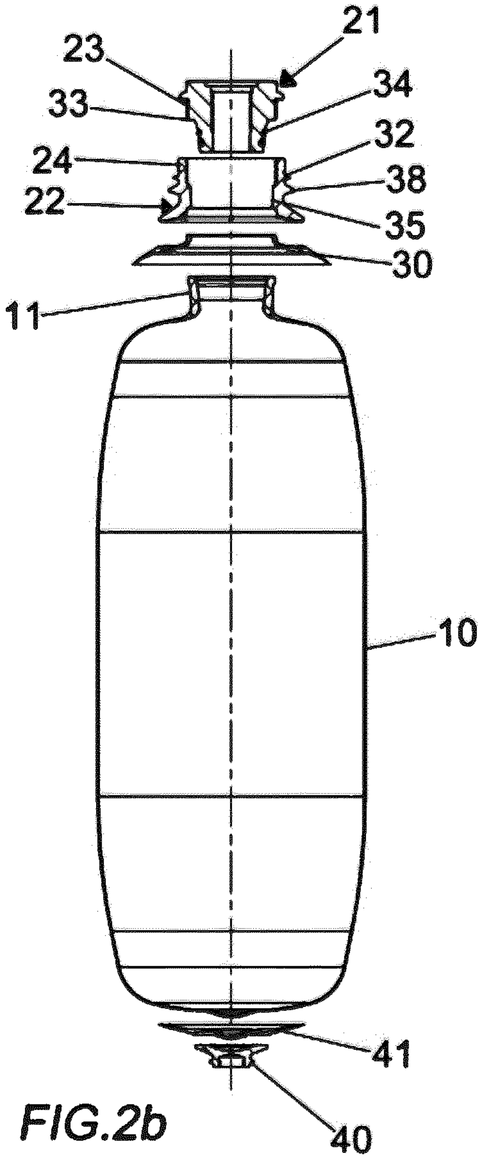

In FIGS. 1*a*, 1*b* the high-pressure cylinder, for containing gases and fluids in general according to the invention, has been denoted by reference numeral 1 and comprises a core or liner 10 made of plastic material, externally covered with a plurality of reinforcing layers in composite material 2, such as, by way of non-limiting example, carbon or Kevlar or mixed fibre yarns embedded in synthetic resins partially incorporating a nozzle 20 in metal and plastic material, applied to the end part/upper orifice of the neck 11 of the core 10.

In particular, the nozzle 20 is made up of three coaxial annular elements, an internal metal element 21 bearing in the upper part an external thread 23 and an external metal element 22 bearing in the upper part an internal thread 24, so that these elements can be screwed together by tightening on the end part of the neck 11 of the core, as will be explained in greater detail here below, and an element in plastic or elastomeric material 30 placed under the external element 22.

The internal element 21 has a head 25 suitably shaped, for example of a hexagonal type, as shown in the example of FIG. 6*a*, or of another shape, for the engaging of a tightening key, and an annular protrusion 37 that abuts against the upper edge of the external element 22.

In a manner in itself known, a thread 26 is provided on the upper internal part of the internal element 21 for mounting/locking a valve or tap, or any other accessory, suitable for dispensing the fluid contained in the cylinder 1. Optionally, on the lower internal part of the internal element 21 a second thread 27 can be provided, as shown in the version of FIG. 7*b*, for mounting other accessories, such as an EFV (Excess Flow Valve).

On the lower external part of the internal element 21, on the other hand, there is provided at least one annular seat 29 (two in the embodiments shown in the drawings) suitable for accommodating a respective sealing gasket 31, for example in particular an O-ring, which comes into contact with the internal surface of the neck 11 of the core 10 of the cylinder 1.

The neck 11 of the core 10 has an annular edge 12 which goes to rest on an internal shoulder 32 of the external element 22 of the nozzle, and on which an external shoulder 33 of the internal element 21 abuts.

The neck 11 of the core 10 has a slight narrowing of diameter starting from its mouth, such as to determine an inclined or conical internal surface 13 suitable for coupling with a corresponding external surface 34 of the internal element 21 of the nozzle 20, and a conical external surface 14 suitable for coupling with a corresponding conical internal surface 35 of the external element 22 of the nozzle 20.

The double conicity of the neck 11 of the core 10, together with the conicity of the internal and external elements of the nozzle, makes it possible to obtain an excellent mechanical coupling between the core and nozzle, since the inclined surfaces increase the adhesion and the resistance to stresses in the axial direction.

The external element 22 of the nozzle 20 has a radial protrusion 38, preferably of hexagonal, octagonal or decagonal shape, for a better grip of the external surface covering 2 and to avoid possible rotations that could occur, when tightening the internal element 21 on the external element 22, and a widened base 28 that goes to rest on the upper part of the core 10 of the container 1.

In order to avoid a biting effect between the metallic material of the external element 22 of the nozzle 20 and the plastic material of the core 10, between this external element 22 and the core 10 said annular protective element in plastic or elastomeric material 30 is interposed, which acts as a bearing.

On the opposite side to the nozzle 20, in the lower part of the core 10, a bottom 40 of metal or also plastic material is applied, with the interposition of a bearing ring 41 of plastic or elastomeric material. This bottom 40 is used to allow the winding of carbon fibre threads to make the external surface covering 2 of the cylinder.

The aforementioned double conicity of the neck 11 of the core 10 would not allow the external element 22 of the nozzle, complete with the bearing 30, to be mounted.

Therefore, with reference to FIGS. 3*a*, 3*b*, 4 and 5 a description is now given of how the cylinder 1 is formed with the nozzle 20.

Figures 3A, 3B:
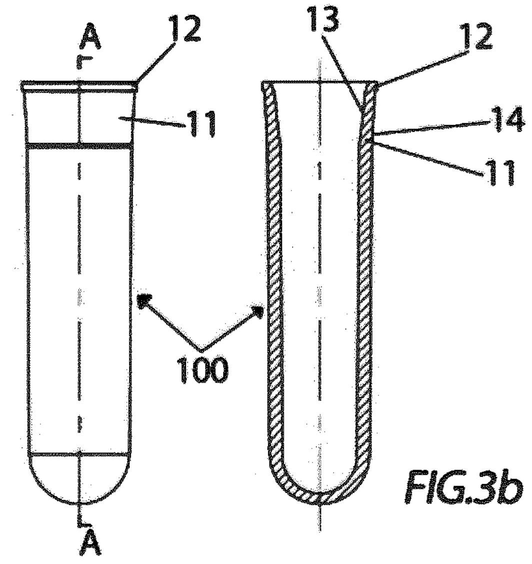

The core 10 is formed by stretch-blow moulding from a preform 100 shown in FIGS. 3*a* and 3*b*, in a view and section respectively.

Figure 4:
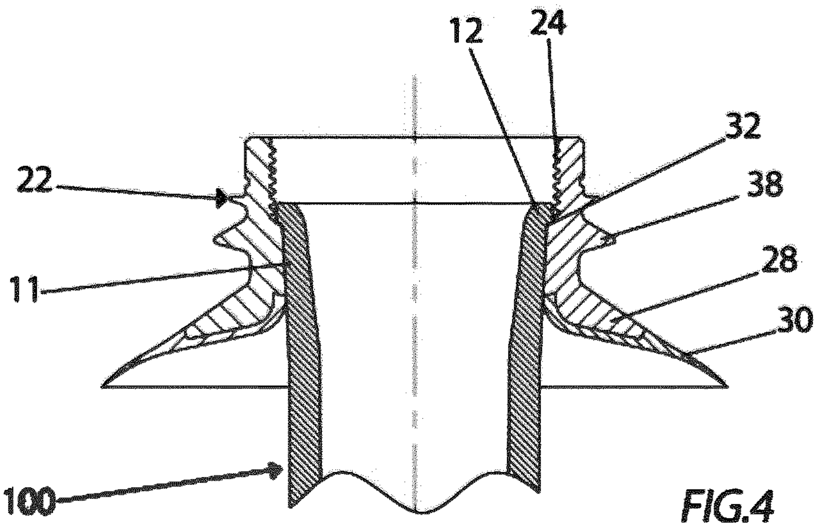
FIG. 4 is an enlarged median section view showing the upper wall of the preform of FIG. 3*b* inserted in the external element of the nozzle prior to stretch-blow moulding.

The conical neck 11 of the preform 100, with said internal 13 and external 14 conicities, which will go to form the neck of the core 10 of the cylinder, allows the preform to be inserted from above into the external element 22 of the nozzle and the underlying protective bearing 30, with the annular edge 12 that goes to rest on the internal shoulder 32 of the external element 22, as shown in FIG. 4.

Figure 5:
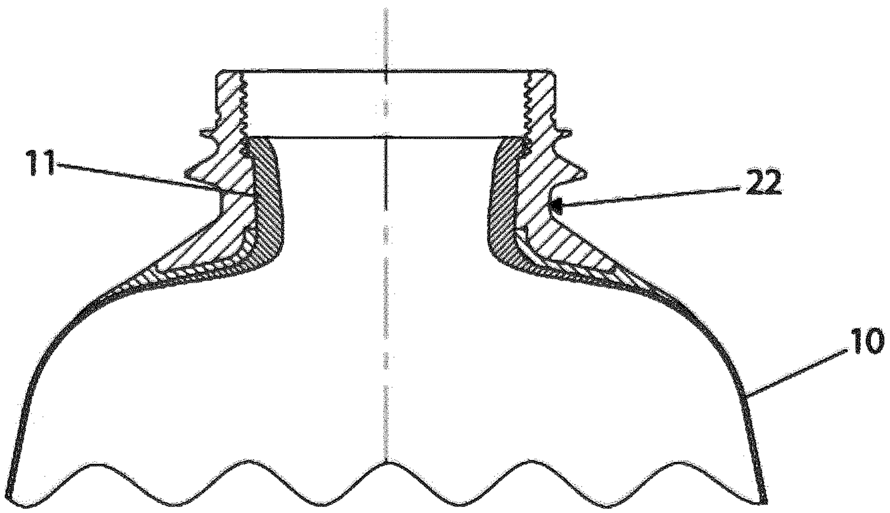
FIG. 5 is a cross-sectional view as in FIG. 4 showing the preform after stretch-blow moulding, which becomes the core or liner of the cylinder, of which only the upper part is shown.

The preform 100 is then stretch-blow moulded to form the core 10 of the cylinder 1, to which the external element 22 of the nozzle is directly applied with the protective component 30 that adheres perfectly to the upper part of the core 10, as shown in FIG. 5.

Before the stretch blow moulding, the preform is subjected to a heat treatment during which the neck 11 of the preform undergoes a phase change that determines a crystallization thereof allowing, after a resumption of mechanical processing, a perfect coupling with the external element 22 of the nozzle and subsequently with the internal element 21.

After the stretching blow moulding of the preform and the application of the bottom 40 on the core 10, carbon fibre threads are wound in order to realize the external surface covering 2 of the cylinder which partially incorporates the external element 22 of the nozzle 20.

Finally, the internal element 21 of the nozzle is screwed, which can be variously shaped, as illustrated in the drawings, which show two exemplary versions of this element.

Naturally, alternatively, the internal element 21 can be mounted prior to the winding of the surface covering 2 in composite material. In any case, the internal element 21 can be removed if necessary for reasons of maintenance or to carry out replacement of the gasket(s).

The cylinder 1 shown in the drawings has a "barrel" shape, i.e. a cylindrical shape tapered above and below, but it is clear that it can be of any desired shape, for example cylindrical with a circular section, square section, rectangular, elliptical, etc.

From what is disclosed, the advantages of the high-pressure cylinder according to the invention and of the relative manufacturing process, which enables a perfect sealed coupling of the nozzle 20 to be obtained, thanks to the double conicity of the neck 11 of the core 10, appear clear.

Naturally, the invention is not limited to the particular embodiment previously described and illustrated in the accompanying drawings, but numerous detailed changes may be made thereto, within the reach of the person skilled in the art, without thereby departing from the scope of the invention itself, as defined in the following claims.

The invention claimed is:

1. An apparatus comprising:

a cylinder having an internal core or liner of a plastic material and a surface covering, the surface covering having at least one layer of composite material; and a nozzle applied to an upper end portion of a neck of the internal core or liner, the nozzle adapted to receive at least one accessory, said nozzle having an internal metal element and an external metal element that are screwable onto each other so as to tighten the neck of the internal core or liner, wherein the neck of the internal core or liner has a slight narrowing of a diameter thereof from a mouth of the neck so as to define an internal conical surface and an external conical surface, the internal conical surface coupleable with an external conical surface of the internal metal element of said nozzle, the external conical surface of the neck having an identical conicity as a conicity of the internal conical surface of the neck, the external conical surface being coupleable with an internal conical surface of the external metal element of said nozzle, wherein said nozzle has an annular protective element interposed between a widened base of the external metal element of said nozzle and an upper part of the internal core or liner of said cylinder, the annular protective element being formed of a plastic or elastomeric material.

2. The apparatus of claim 1, wherein the neck of the internal core or liner has an annular edge resting on an internal shoulder of the external metal element of said nozzle, an external shoulder of the internal metal element abutting the annular edge.

3. The apparatus of claim 1, wherein the internal metal element of said nozzle has at least one annular seat adapted to receive a sealing gasket, the at least one annular seat contacting the internal conical surface of the neck.

4. The apparatus of claim 1, wherein the internal metal element of said nozzle has an annular protrusion that abuts an upper edge of the external metal element.

5. The apparatus of claim 1, wherein the external metal element of said nozzle has a radial protrusion gripping the surface covering.

6. The apparatus of claim 1, wherein the internal metal element has a thread at an upper internal portion thereof, the thread adapted to block a valve or tap that dispenses fluid from said cylinder.

7. The apparatus of claim 6, wherein the internal metal element has another thread at a lower internal portion thereof, the another thread adapted to mount an accessory thereto.

* * * * *